US005706444A

United States Patent [19]
Dobbins et al.

[11] Patent Number: 5,706,444
[45] Date of Patent: Jan. 6, 1998

[54] METHOD AND APPARATUS FOR TRANSMISSION OF SIGNALS OVER A SHARED LINE

[75] Inventors: Timothy M. Dobbins; Zohar Bogin, both of Folsom, Calif.

[73] Assignee: Intel Corporation, Santa Clara, Calif.

[21] Appl. No.: 590,954

[22] Filed: Jan. 24, 1996

Related U.S. Application Data

[63] Continuation of Ser. No. 210,560, Mar. 18, 1994, Pat. No. 5,533,200.

[51] Int. Cl.$^6$ ............................................. G06F 13/00
[52] U.S. Cl. ............................................ 395/280; 395/293

[56] References Cited

U.S. PATENT DOCUMENTS

| | | | |
|---|---|---|---|
| 4,106,104 | 8/1978 | Nitta et al. | 395/900 |
| 4,365,293 | 12/1982 | Holtz et al. | 364/200 |
| 4,379,294 | 4/1983 | Sutherland et al. | 340/825.5 |
| 4,442,502 | 4/1984 | Friend et al. | 365/325 |
| 4,481,572 | 11/1984 | Ochsner | 364/200 |
| 4,490,788 | 12/1984 | Rasmussen | 395/275 |
| 4,628,480 | 12/1986 | Floyd | 364/900 |
| 4,706,245 | 11/1987 | Suzuki et al. | 370/85 |
| 4,760,515 | 7/1988 | Malmquist et al. | 395/325 |
| 4,835,414 | 5/1989 | Freidin | 307/243 |
| 4,858,112 | 8/1989 | Puerzer et al. | 395/325 |
| 4,870,571 | 9/1989 | Frink | 364/200 |
| 4,987,529 | 1/1991 | Craft et al. | 395/325 |
| 5,131,007 | 7/1992 | Brown et al. | 375/40 |
| 5,160,922 | 11/1992 | DeRossa et al. | 340/825.52 |
| 5,239,630 | 8/1993 | Lary et al. | 395/325 |
| 5,345,566 | 9/1994 | Tanji et al. | 395/308 |
| 5,359,715 | 10/1994 | Heil et al. | 395/308 |
| 5,379,384 | 1/1995 | Solomon | 395/308 |
| 5,392,033 | 2/1995 | Oman et al. | 340/825.5 |
| 5,418,914 | 5/1995 | Heil et al. | 395/308 |

*Primary Examiner*—Jack B. Harvey
*Assistant Examiner*—David A. Wiley
*Attorney, Agent, or Firm*—Blakely, Sokoloff, Taylor & Zafman

[57] ABSTRACT

A semiconductor component which is capable of controlling transmission of information between a plurality of semiconductor components in a computer system. The semiconductor component comprises of a first signal generator capable of sending a signal of a first type over a shared line and a second signal generator capable of sending a signal of a second type over the line. It also comprises of a first logic device capable of controlling the first signal generator and a second logic device capable of controlling the second signal generator.

8 Claims, 12 Drawing Sheets

|  | 15 | 14 | 13 | 12 | 11 | 0 | |
|---|---|---|---|---|---|---|---|
|  | M/IO# | D/C# | W/R# | ADDRESS | | | C1 |
|  | BYTE ENABLE | | | ADDRESS | | | C2 |
|  | DATA | | | | | | D1 |
|  | DATA | | | | | | D2 |
|  | GO/ABORT | | | RESERVED | | | |

|  | 15 | 14 | 13 | 12 | 11 | 0 | |
|---|---|---|---|---|---|---|---|
|  | M/IO# | D/C# | W/R# | ADDRESS | | | C1 |
|  | BYTE ENABLE | | | ADDRESS | | | C2 |
|  | GO/ABORT | | | RESERVED | | | |
|  | DATA | | | | | | D1 |
|  | DATA | | | | | | D2 |

|  | 15 | 14 | 13 | 12 | 11 | 0 | |
|---|---|---|---|---|---|---|---|
|  | 1 | 0 | 1 | W/R# | ENCODED SELECTS | | C1 |
|  | BYTE ENABLE | | | ENCODED SELECTS | ADDRESS | | C2 |
|  | GO/ABORT | | | RESERVED | | | |
|  | DATA | | | | | | D1 |
|  | DATA | | | | | | D2 |

FIG. 5

METHOD AND APPARATUS FOR TRANSMISSION OF SIGNALS OVER A SHARED LINE

This is a continuation of application Ser. No. 08/210,560, filed Mar. 18, 1994 now U.S. Pat. No. 5,533,200.

FIELD OF THE INVENTION

The present invention relates to the field of computer systems. More particularly, the present invention relates to the transmission of signals over a shared line in a computer system.

BACKGROUND OF THE INVENTION

Microprocessors, controllers and other semiconductor components communicate to each other and to external devices through pins. In traditional computer architecture, each signal is allocated a separate pin to the component. Thus, when a new design specifies a new signal, a new pin has to be added to the component. When the total number of pins reaches a certain number, the existing die size of the semiconductor component can no longer support all of the pins. At that point, the die size of the component has to be increased to accommodate the additional pins. However, the increase in die size leads to higher fabrication costs because the number of components produced from a given wafer size decreases. The increase in die size also leads to higher fabrication costs because the yield as measured by percentage of acceptable components decreases with increasing die size.

For semiconductor components with high market values, the additional fabrication costs incurred by use of a larger die size is not significant. However, for semiconductor components with lower market values, the additional fabrication costs from a larger die size has a more significant impact in proportional terms.

Thus, what is needed is a method and apparatus which allows for sharing of a pin between different functions to reduce the total number of pins required and thus eliminating the need for a larger die size. What is also needed is a method and apparatus which also allows the pin to transmits signals of different types thus reducing the total number of pins required and eliminating the need for a larger die size.

SUMMARY OF THE INVENTION

A novel semiconductor component is described. The semiconductor component is capable of controlling transmission of information between a plurality of semiconductor components in a computer system. The semiconductor component comprises of a first signal generator capable of sending a signal of a first type over a shared line and a second signal generator capable of sending a signal of a second type over the shared line. It also comprises of a first logic device capable of controlling the first signal generator and a second logic device capable of controlling the second signal generator. The signal of a first type can be a command, status, address or data signal and the signal of a second type can also be a command, status, address or data signal. Under an alternative embodiment, the semiconductor component can also include a first receiver capable of receiving the signal of a first type over the shared line and a second receiver capable of receiving the signal of a second type over the shared line. In addition, the semiconductor component can include an arbiter capable of arbitrating access to the shared line. Moreover, the semiconductor component can include a signal generator or receiver for a completion signal that indicates the completion of a previous transfer. Furthermore, the semiconductor component can also include a signal generator or a receiver for a command indication signal indicating the transmission of a command signal over the shared line.

BRIEF DESCRIPTION OF THE DRAWINGS

The present invention is illustrated by way of example, and not by way of limitation, in the figures of the accompanying drawings and in which like reference numerals refer to similar elements and in which:

FIG. 5 is a table illustrating the protocol used in the fifth embodiment of the present invention.

DETAILED DESCRIPTION

A novel controller and method for controlling the transmission of information between a plurality of semiconductor components is described. In the following description, the invention is described with reference to specific exemplary embodiments thereof. It will, however, be evident that various modifications and changes may be made thereto without departing from the broader spirit and scope of the invention as set forth in the appended claims. The specifications and drawings are, accordingly, to be regarded in an illustrative rather than a restrictive sense.

Figure 1:
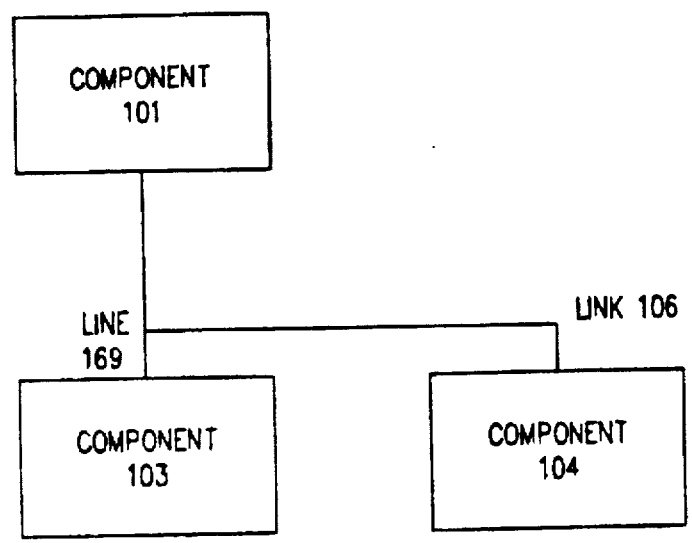
FIG. 1 is a block diagram illustrating a semiconductor component of one embodiment of the present invention.

FIG. 1 is a block diagram illustrating a semiconductor component of one embodiment of the present invention. Semiconductor component 103 is coupled to semiconductor component 104 via link 106. Both component 103 and component 104 reside in a single computer system. Component 103 transmits a plurality of different signal types to component 104 on link 106. Component 104 also transmits a plurality of different signal types on link 106. The different signal types can include address signals, command signals, status signals and data signals. Line 106 is coupled to line 169. Line 169 can be a dedicated line specifically dedicated for transmitting signals between component 103 and component 104 or line 169 can be a shared line used for other purposes as well. In this embodiment, line 169 is a shared line. In addition to transmitting a plurality of signal types between component 103 and component 104, line 169 also acts as an address line for address signals transmitted between component 101 and component 103. It will be appreciated that line 169 could also act as part of a command line or data line or status line between component 101 and component 103. It will also be appreciated component 101, component 103 and component 104 can be a microprocessor, microcontroller, bus controller, memory controller or the like.

Figure 2:
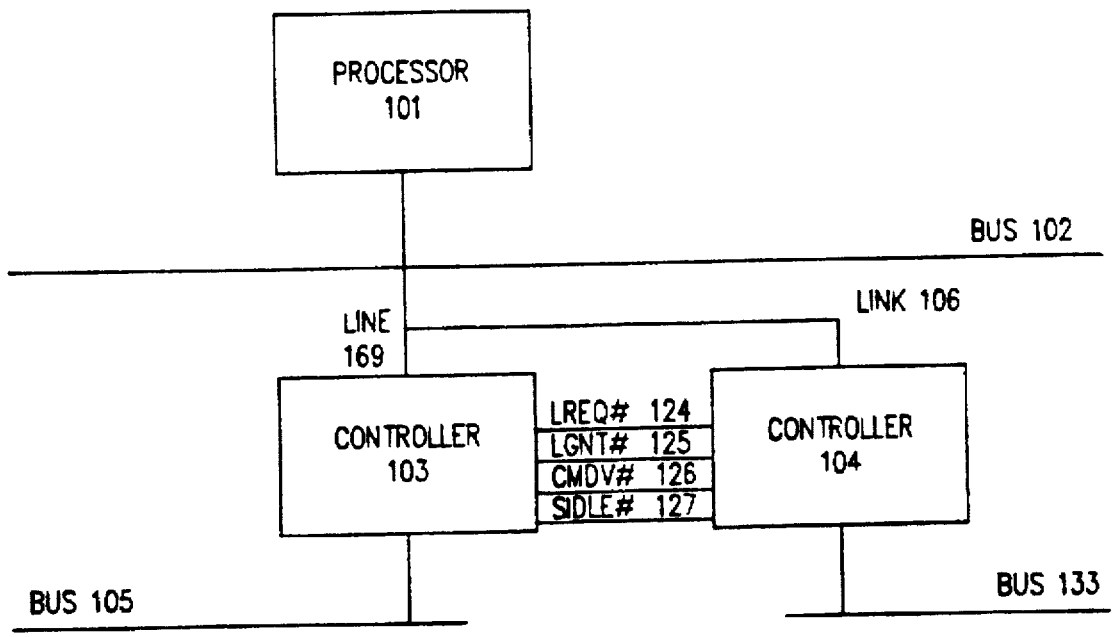
FIG. 2 is a block diagram illustrating a computer system of the second embodiment of the present invention.

FIG. 2 is a block diagram illustrating a computer system of the second embodiment of the present invention. In this computer system, component 103 is a bus controller controlling the transmission of signals on bus 105. Component 104 is also a bus controller but it controls the transmission of signals on a separate bus, bus 133. Component 101 is a processor coupled to yet another bus, bus 102 which is in turn is coupled to controller 103. Controller 103 and controller 104 are coupled together by link 106 and line 169. In this embodiment, as described above, line 169 performs a dual function. It transmits command, address and data signals between controller 103 and controller 104 through link 106. It also acts as an address line for address signals between processor 101 and controller 103. Because of the dual function performed by link 106, the computer system needs to arbitrate access to link 106. Consequently, in this embodiment, controller 103 also has an arbiter for link 106. It will be appreciated that the arbiter can be located elsewhere, for instance, on processor 101 or controller 104.

In this embodiment, controller 103 and controller 104 are also coupled together by four separate dedicated lines carrying four unique sideband signals. Request line 124 transmits an active low request signal (LREQ#) between controller 103 and controller 104. Grant line 125 transmits an active low grant signal (LGNT#) between controller 103 and controller 104. Command indication line 126 transmits an active low command indication signal (CMDV#) between controller 103 and controller 104. Finally, idle line 127 transmits an active low completion signal between (SIDLE#) between controller 103 and controller 104. CMDV# can be transmitted by controller 103 when it is the link master or by controller 104 when it is the link master. Likewise, SIDLE# can be transmitted by controller 103 when it is the link slave or by controller 104 when it is the link slave.

The LREQ#, LGNT#, CMDV# and SIDLE# signals used in this embodiment can be further described as follows. The LREQ# signal is a signal used by controller 104 to request access to link 106. Before controller 104 attempts to initiate a read or write cycle over link 106, it asserts LREQ# for access. When controller 103 is ready to grant access to controller 104, it asserts LGNT#. Thus, the LGNT# signal is a signal used by controller 103 to grant access to link 106. It will be appreciated that controller 104 will not initiate a read or write cycle over link 106 until controller 103 asserts LGNT#.

In addition, the CMDV# signal is a signal used by controller 103 or controller 104 to indicate when it is transmitting a command signal. Controller 103 or controller 104 asserts CMDV# when it sends the first command packet and deasserts CMDV# after it sends the last command packet. For example, if controller 103 sends two command packets followed by a GO or ABORT packet, it asserts CMDV# during the duration of the three packets. On the other hand, if controller 103 sends two command packets followed by two data packets followed by a GO or ABORT packet, it asserts CMDV# during the duration of the two command packets, deasserts CMDV# during the duration of the two data packets and asserts CMDV# again during the duration of the GO or ABORT packet.

Moreover, the SIDLE# signal is a signal used by controller 103 or controller 104 to indicate the end of the requested transaction and thus its availability to receive a subsequent transaction. When controller 103 initiates a read or write cycle over link 106, controller 104 becomes the slave. Likewise, when controller 104 initiates a read or write cycle over link 106, controller 103 becomes the slave. SIDLE# is asserted by the slave, either controller 103 or controller 104 at least one clock cycle before the first command packet is transmitted. The assertion indicates availability of the slave to process a transaction. The slave deasserts SIDLE# on the clock edge that the second command packet is received. SIDLE# remains deasserted until the requested read or write cycle is completed, or until the ABORT command is delivered. On a read cycle, the reassertion of SIDLE# occurs during the same cycle that the low order word is driven on link 106. The high order word always follows the low order word. For write cycles, the reassertion of SIDLE# indicates completion of the write on the destination bus.

Figure 3A:
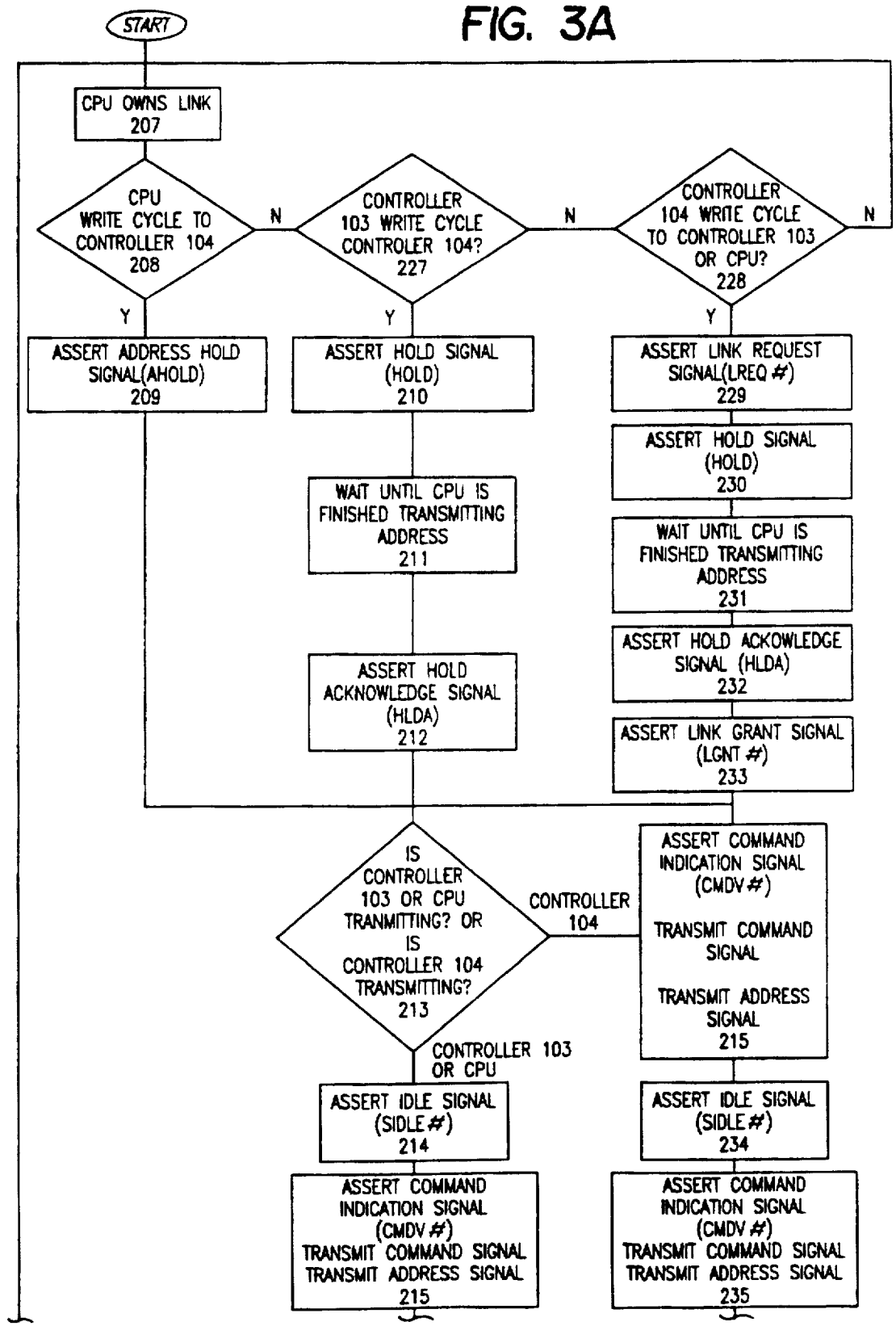
FIGS. 3A and 3B is a flowchart illustrating the operations of the third embodiment of the present invention.
Figure 3B:
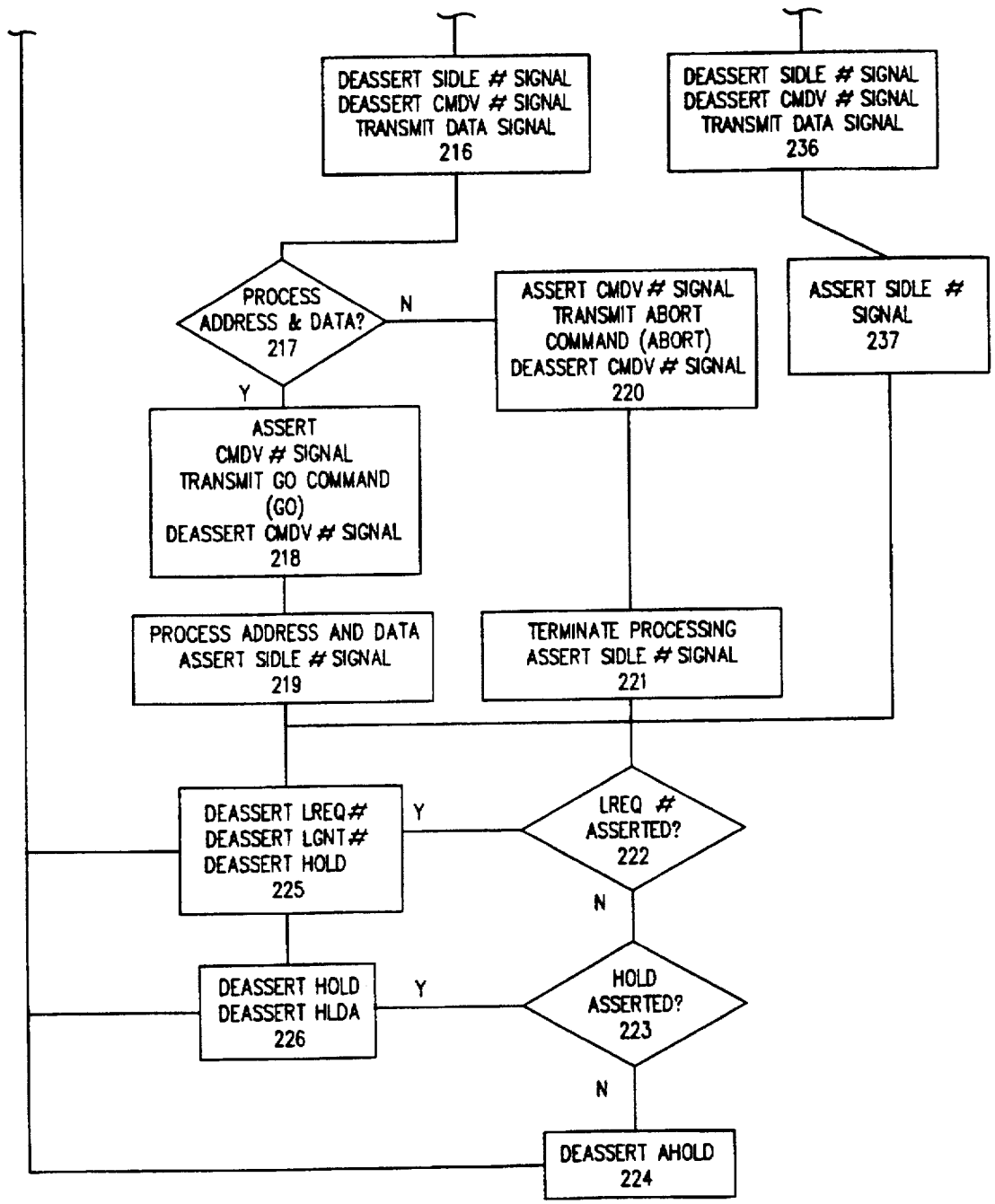

FIGS. 3A and 3B is a flowchart illustrating the operation of the third embodiment of the present invention. In this example, for ease of explanation, only write cycle operations are illustrated. It will be appreciated that read cycle operations are similar except that any GO or ABORT commands are transmitted after command and address signals but before data signals. In this embodiment, processor 101 is a central processing unit (CPU). As such, CPU 101 is the master and in default owns the address lines to controller 103. Thus, when the computer system is powered up, CPU 101 owns the address lines to controller 103 as shown in block 207. Because address line 169 from CPU 101 to controller 103 forms a part of the transmission path from controller 103 to controller 104, when CPU 101 owns the address line to controller 103, nothing can be transmitted between controller 103 and controller 104. Thus, before any transmission can occur between controller 103 and controller 104, CPU 101 must relinquish the address line to controller 103. The initial steps to cause CPU 101 to relinquish the address line is dependent on the component initiating the transmission. When controller 103 initiates the transmission to controller 104 (block 227), it first asserts a hold signal (HOLD) as shown in block 210. Controller 103 waits until CPU 101 has finished transmitting the current address over the address line (block 211). When transmission is completed, CPU 101 asserts a hold acknowledge signal (HLDA) as shown in block 212 and floats the address line. On the other hand, when controller 104 initiates the transmission (block 228), the initial steps differ. In default, when CPU 101 does not have access to the address line, controller 103 owns link 106 and both LGNT# and LREQ# are deasserted. Thus, prior to gaining access to link 106, controller 104 asserts a request signal (LREQ#) over the LREQ# line 124 as shown in block 229. In response to the LREQ# signal, controller 103 asserts a hold signal (HOLD) to CPU 101 as shown in block 230. Controller 103 and controller 104 wait until CPU 101 has finished transmitting the current address over the address line (block 231). When CPU 101 has finished, it asserts a hold acknowledge (HLDA) signal to controller 103 as shown in block 232. CPU 101 also floats the address line. Upon receipt of the HLDA signal by controller 103, controller 103 asserts a grant signal (LGNT#) signal over LGNT# line 125 to controller 104 (block 233). It will be appreciated that only controller 103 asserts LGNT# and only controller 104 asserts LREQ# in this embodiment. It will also be appreciated that access to link 106 is arbitrated. Thus, only controller 103 or controller 104 can transmit at any given time. Consequently, link 106 is a half duplex link.

The initial steps also differ if CPU 101 initiates the transmission instead of controller 103 or controller 104 (block 208). When CPU 101 transmits to controller 103, no transmission over link 106 is necessary and thus CPU 101 does not have to relinquish the address line to controller 103. However, when CPU 101 transmits to controller 104, the transmission must first go through controller 103 and then later proceed over link 106 to controller 104. In this case, link 106 is utilized and thus CPU 101 must relinquish control of the address line to controller 103. When transmitting to controller 104, CPU 101 first transmits the information to controller 103. Upon receipt of the transmission, controller 103 asserts an address hold signal (AHOLD) as shown in block 209. Controller 103 has a latch coupled to the address line from CPU 101. As such, when CPU 101 transmits an address over the address line, the address is immediately stored by controller 103. Thus, the address line is available for use one clock cycle after an address has been transmitted from CPU 101 to controller 103. Because of the latch in controller 103, CPU 101 can float the address line after it receives the address hold signal (AHOLD) from controller 103 without loss of information.

When controller 104 transmits the write cycle, controller 103 then asserts the idle signal (SIDLE#) as shown in block 234. The assertion of SIDLE# signal is an indication from controller 103 to controller 104 that it is available to receive a transmission from controller 104. Controller 104 must sample SIDLE# active before it transmits a command. After controller 103 asserts the SIDLE# signal to controller 104, controller 104 asserts a command indication signal (CMDV#) and at the same time transmits command signals and address signals (block 235). The CMDV# signal is an indication from controller 104 to controller 103 that command signals are being sent over link 106. While controller 103 is still receiving command and address signals from controller 104, it does not process the command or address signals. Thus, controller 103 is still available and keeps the SIDLE# signal asserted while it is still receiving the command and address signals. When controller 103 has received all the command and address signals, it deasserts the SIDLE# signal (block 236) because it starts to process the command and address signals and is no longer available. Controller 104 also deasserts the CMDV# signal because it has completed transmission of the command signals and the command signals are no longer on link 106. Controller 104 then begins transmitting data signals. After controller 103 has completed processing the write cycle, it asserts the SIDLE# signal as shown in block 237.

When controller 103 or the CPU transmits the write cycle, controller 104 then asserts the idle signal (SIDLE#) as shown in block 214. The assertion of SIDLE# signal is an indication from controller 104 to controller 103 that it is available to receive a transmission from controller 103. Controller 103 must sample SIDLE# active before it transmits a command. After controller 104 asserts the SIDLE# signal to controller 103, controller 103 asserts a command indication signal (CMDV#) and at the same time transmits command signals and address signals (block 215). The CMDV# signal is an indication from controller 103 to controller 104 that command signals are being sent over link 106. While controller 104 is still receiving command and address signals from controller 103, it does not process the command or address signals. Thus, controller 104 is still available and keeps the SIDLE# signal asserted while it is still receiving the command and address signals. When controller 104 has received all the command and address signals, it deasserts the SIDLE# signal because it starts to process the command and address signals and is no longer available. Controller 103 also deasserts the CMDV# signal because it has completed transmission of the command signals and the command signals are no longer on link 106. In addition, controller 103 begins transmitting data signals. During the time it sends data signals, controller 103 makes a determination whether to have controller 104 continue processing the address and data just transmitted (block 217). That determination is based on whether controller 104 or any component on bus 133 is the destination for data. If controller 104 or a component on bus 133 is the destination for data, controller 104 continues processing the address and data transmitted from controller 103. On the other hand, if neither controller 104 nor any components on bus 133 is the destination for data, controller 104 ceases processing of address and data transmitted from controller 103. Controller 103 causes controller 104 to continue processing of the transmitted address and data by asserting a CMDV# signal and then transmitting a go command (GO) as shown in block 218. Controller 104 then completes processing of the address and data. It asserts SIDLE# upon completion (block 219). Controller 103 causes controller 104 to cease processing of the transmitted address and data by asserting a CMDV# signal and then transmitting an abort command (ABORT) as shown in block 220. Controller 104 terminates processing and asserts SIDLE# (block 221). When controller 103 transmits an ABORT command, controller 104 has one cycle to decode the ABORT and drives SIDLE# on the next clock edge. In this embodiment, the format for the GO command is 0000h and the format for the ABORT command F000h. The GO or ABORT command may be sent any time after the transmission of the two data packets.

It would be appreciated that the GO command and the ABORT command allows controller 103 to transmit command, address and data signals to controller 104 before decoding the destination of the command, address and data signals. This feature is beneficial because it allows controller 104 to begin processing of the command and address signals by setting up the bus 133 address while controller 103 is determining the destination of the information. In this embodiment of the present invention, controller 103 determines the destination of the information by a subtractive decode operation. It makes an inquiry on bus 105. An individual component on bus 105 will respond if it is the destination of the information. After a certain specified time, when controller 103 receives no responses from the components on bus 105, it assumes that the destination is on bus 133 and issues a GO command. On the other hand, if a component on bus 105 responds to the inquiry by controller 103, controller 103 knows that the destination of the information is not on bus 133 and issues an ABORT command.

Upon the assertion of SIDLE# as shown in block 219, 221 or 237, controller 103 and controller 104 completes the write cycle operation as follows. If LREQ# is asserted (block 222) indicating a write cycle initiated by controller 104, controller 104 deasserts LREQ#. Controller 103 then deasserts LGNT# and HOLD (block 225). CPU deasserts HLDA and the system returns to block 207 where the CPU owns the link again. On the other hand, if HOLD is asserted (block 223) indicating a write cycle initiated by controller 103, controller 103 deasserts HOLD, CPU deasserts HLDA (block 226) and the system returns to block 207. Finally, if a AHOLD is asserted indicating a write cycle initiated by CPU, controller 103 deasserts AHOLD and the system returns to block 207.

Under this embodiment, strict ordering is preserved. Controller 103 will not transmit any cycle to controller 104 until it completes all cycles posted in front of that cycle.

Similarly, controller 103 will not issue a LGNT# signal to controller 104 until it has completed all posted cycles.

The HOLD, HLDA and AHOLD signals used in this embodiment can be further described as follows. The HOLD signal is a signal asserted by controller 103 requesting control of transmission lines coupled to CPU 101. The HLDA signal is a signal asserted by CPU 101 indicating that it has floated the transmission lines. The AHOLD signal is a signal asserted by controller 103 requesting control of address line 169. Unlike the HOLD signal, CPU 101 does not respond with a HLDA signal. Instead, it floats address line 169 in the next clock. CPU 101 only floats the address lines and does not float command or data lines. In addition, the GO command is a command used by controller 103 to instruct controller 104 to continue processing of previously transmitted information. On the other hand, the ABORT command is a command used by controller 103 to instruct controller 104 to terminate processing of previously transmitted information.

Figure 4A:
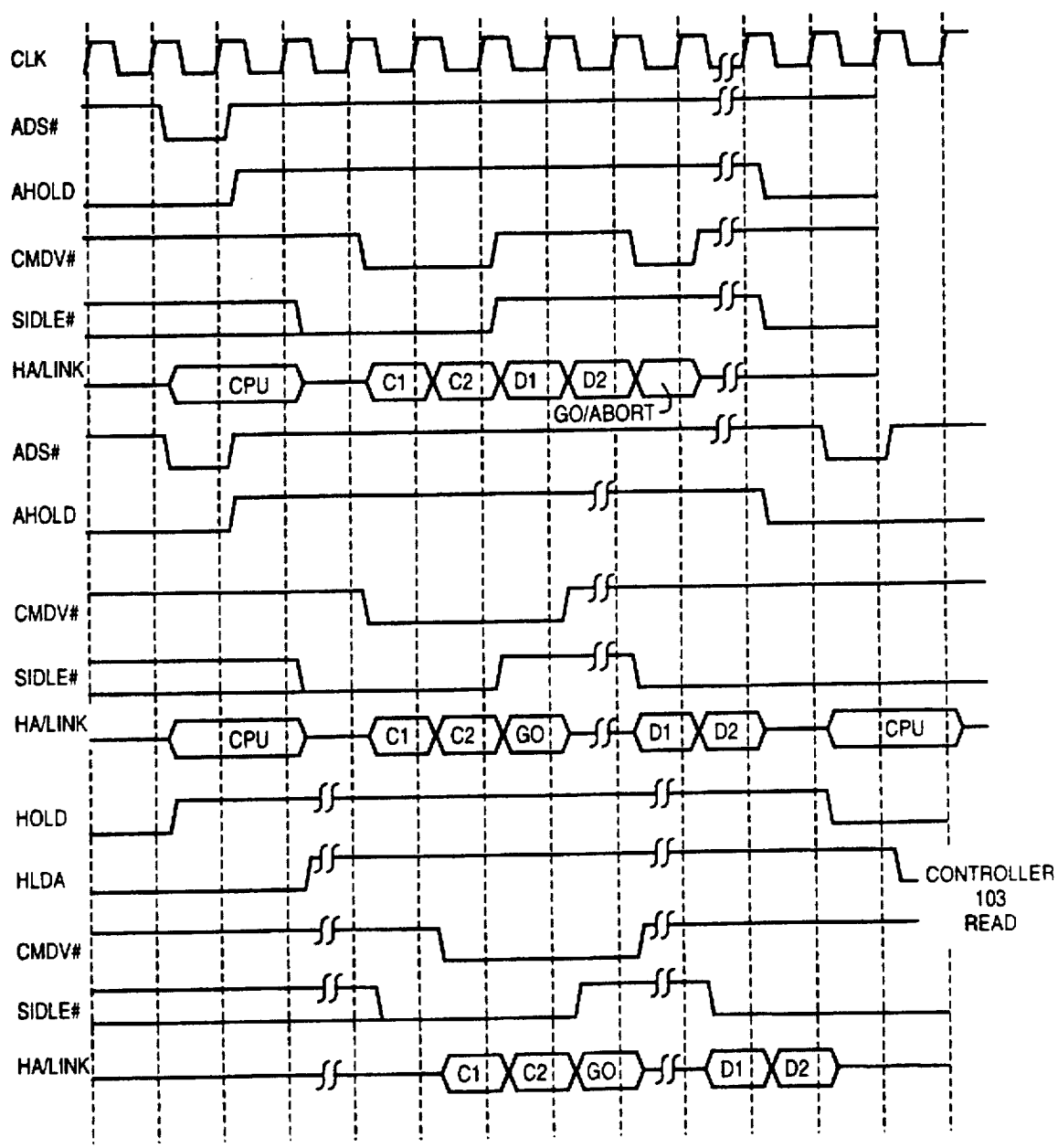
FIGS. 4A and 4B is a timing diagram further illustrating the operations of the fourth embodiment of the present invention.
Figure 4B:
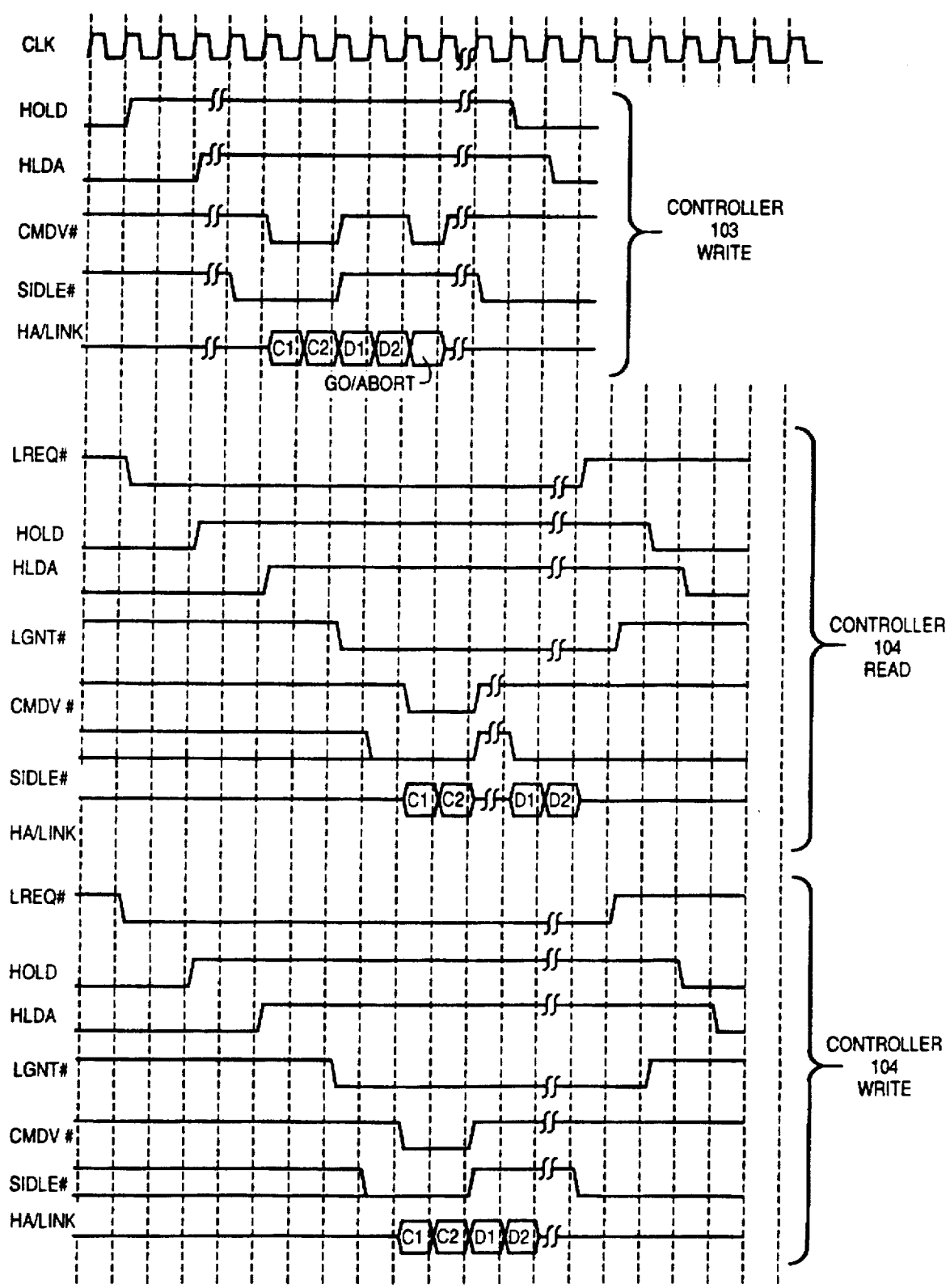

FIGS. 4A and 4B is a timing diagram illustrating the operations of the fourth embodiment of the present invention. When CPU 101 engages in a write cycle through controller 103 to controller 104, it begins by asserting a ADS# signal. The ADS# signal indicates that the address and bus definition signals from CPU 101 are valid. At the same time, it begins transmitting command, status, address and data information to controller 103. After controller 103 receives the address over the address line between CPU 101 and controller 103, it asserts the AHOLD signal. When CPU 101 receives the AHOLD signal, it floats the address line within one clock cycle. At this point, link 106 is available for use by controller 103. Controller 104 asserts the SIDLE# signal, to indicate its readiness for receiving information. Controller 103 responds by asserting the CMDV# signal and transmitting the command, status and address signals. When the command, status, and address signals have been transmitted, controller 103 deasserts the CMDV# signal and controller 104 deasserts the SIDLE# signal. Controller 103 then transmits the data packets. After the data is transmitted, controller 103 asserts the CMDV# signal and transmits either a GO or an ABORT command. When controller 104 has finished processing the command, status, address and data, it asserts the SIDLE# signal indicating its readiness for the next transaction and the end of the requested transaction. Controller 103 also deasserts the AHOLD signal to free the address line for use by CPU 101.

FIGS. 4A and 4B also illustrates the sequence of events when CPU 101 initiates a read cycle through controller 103 to controller 104. CPU 101 begins by asserting the ADS# signal and at the same time transmitting command and address signals to controller 103. When controller 103 receives the address over the address line, it asserts the AHOLD signal and in response, CPU 101 floats the address line. Controller 104 then asserts the SIDLE# signal, followed by controller 103 asserting the CMDV# signal. At that point, controller 103 transmits over link 106 command, status and address signals. When controller 104 has received all of the command, status and address signals, it deasserts the SIDLE# signal. However, controller 103 keeps the CMDV# signal asserted and transmits a GO command. Controller 103 then deasserts the CMDV# signal. When controller 104 has retrieved the data requested by CPU 101, it asserts the SIDLE# signal and transmits the data over link 106. Because controller 104 has put the data requested by CPU 101 over link 106, it is now available to process the next transaction and consequently it asserts the SIDLE# signal. When controller 103 receives the data, it deasserts the AHOLD signal and transmits the data back to CPU 101.

Moreover, FIGS. 4A and 4B also illustrates the sequence of events when a component on bus 105 or controller 103 initiates a write cycle across link 106 to controller 104. Controller 103 initiates the sequence by asserting a HOLD signal to CPU 101. When CPU 101 has completed the transmission of the current address, it asserts a HLDA signal to controller 103 and floats the address line. Controller 104 then asserts the SIDLE# signal indicating it is ready to receive a transmission over link 106. Upon receipt of the SIDLE# signal, controller 103 asserts the CMDV# signal indicating that it is transmitting command signals over link 106. At the same time, controller 103 transmits command, status, and address signals over link 106. When controller 103 has completed the transmission of command, status, and address signals, it deasserts the CMDV# signal and controller 104 deasserts the SIDLE# signal. Controller 103 then transmits the data over link 106 to controller 104. After the data is transmitted, controller 103 asserts the CMDV# signal and transmits a GO command or an ABORT command as appropriate and deasserts the CMDV# signal. When controller 104 has finished processing the command, status, address and data signals, it asserts the SIDLE# signal. Controller 103 deasserts the HOLD signal and CPU 101 deasserts the HLDA signal. A read cycle initiated by a component on bus 105 or controller 103 is also illustrated. It will be appreciated that the read cycle is similar to the CPU read cycle over link 106 described above with the exception that controller 103 asserts a HOLD signal and waits for a HLDA signal instead of asserting a AHOLD signal Furthermore, FIGS. 4A and 4B also illustrates the sequence of events when controller 104 transmits a write cycle over link 106 to controller 103. Controller 104 first asserts a LREQ# signal to controller 103 requesting access to link 106. In response to the LREQ# signal, controller 103 asserts a HOLD signal to CPU 101. When CPU 101 has finished transmitting the current address over the address lines, it asserts a HLDA signal and floats the address lines. Upon receipt of the HLDA signal, controller 103 then asserts a LGNT# signal to controller 104 granting controller 104 access to link 106. Controller 103 asserts the SIDLE# signal over link 106 indicating its availability. Controller 104 then asserts the CMDV# signal indicating that it is transmitting command signals over link 106 at the same time it transmits the command, status and address signals. When it has completed transmitting the command, status and address signals, controller 104 deasserts the CMDV# signal and controller 103 deasserts the SIDLE# signal. It then transmits the data signals in the form of packets. When the data signals have been transmitted, controller 104 deasserts the LREQ# signal. Controller 103 then responds by deasserting the LGNT# signal. It also deasserts the HOLD signal which causes CPU 101 to deassert the HLDA signal. In this manner controller 104 relinquishes control of link 106 and CPU 101 regains control of the address line.

FIG. 5 is a table illustrating the protocol used in the fifth embodiment of the present invention. In this embodiment, link 106 comprises of 16 separate lines and thus can transmit 16 bits at one time. In this protocol, command, status, address and data signals are transmitted serially over link 106 in five separate packets. In this manner, individual lines in link 106 can transmit command, status, address and data signals. The first packet format is the protocol used for a write cycle initiated by a component on bus 105, controller 103 or CPU 101 over link 106. In the first packet, the C1 packet, the first thirteen lines (0:12) are used to transmit address signals to controller 104. Line 13 is used to transmit a W/R# signal which indicates whether the cycle is a read or write cycle. Line 14 is used to transmit a D/C# signal which indicates whether the write cycle contains data or control signals. Line 15 of the first packet is used to transmit a M/IO# signal which indicates whether the write cycle is to memory or input-output component. The second packet, the C2 packet is transmitted after the C1 packet. In the C2 packet, the first twelve lines (0:11) is used to transmit address signals. The remaining four lines (12:15) is used to transmit byte enables. Byte enable signals indicate active bytes during read and write cycles. When the byte enable is active for a particular byte, the data transmitted is valid. In the third packet, the D1 packet, all sixteen lines (0:15) is used to transmit data. Similarly, in the fourth packet, the D2 packet, all sixteen lines are used to transmit data. In the fifth packet, the first twelve lines (0:11) are reserved. The remaining four lines (12:15) are used to transmit the GO command or the ABORT command. FIG. 5 also illustrates the protocol used when controller 103 or CPU 101 initiates a read cycle over link 106. The read cycle protocol is similar to the write cycle protocol initiated by controller 103 or CPU 101. Controller 103 transmits the M/IO# signal, D/C# signal, W/R# signal, byte enables, and address signals in the same manner as described above. However, the third packet instead of being a data packet, contains the GO command or the ABORT command. The fourth packet is a data packet, the D1 packet with all sixteen lines (0:15) transmitting data signals to controller 104. The fifth packet is also a data packet, the D2 packet with all sixteen lines (0:15) transmitting data to controller 104.

The protocol also includes a special format for transmitting information to controller 104 where controller 104 is the destination for the information. Under the special format, the first packet is a command packet, the C1 packet. Controller 103 transmits encoded selects over the first twelve lines (0:11). Controller 103 transmits a W/R# signal over the thirteenth line and transmits a 101 over the last three lines (13:15) respectively. The second packet is also a command packet, the C2 packet. Controller 103 transmits address signals over the first six lines (0:5). It also transmits encoded selects over the next six lines (6:11) and transmits byte enables over the last four lines (12:15). The encoded selects indicate actual destination in terms of the specific function block in controller 104. The third packet is used to transmit a GO or ABORT command which is transmitted over four lines (12:15). The fourth and fifth packets, the D1 and D2 packets respectively are used to transmit data signals. Controller 103 transmits data signals over all sixteen lines (0:15). In a write cycle, the third packet is the D1 packet, the fourth packet is the D2 packet and the fifth packet is the GO or ABORT packet.

Under this protocol, when controller 104 instead of controller 103 initiates a read cycle or a write cycle, the format is similar to the read cycle and write cycle format described above with the exception that the packet containing the GO or ABORT command does not exist. As such, a read or write cycle initiated by controller 104 only has four packets instead of five packets.

It will be appreciated that the protocol described allows link 106 to transmit signals of different types over a single line in a link 106. As a result, the number of lines needed to transmit the same information decreases when compared to systems utilizing lines that transmit only one signal type. In this example, link 106 only requires 16 lines because of the transmission of multiple signal types. Traditional systems on the other hand, would require at least 37 lines to transmit the same amount of information. Thus, use of lines which transmit different signal types and the protocol to support the use saves at least 21 lines. This line savings results in similar savings of 21 pins.

Figure 6:
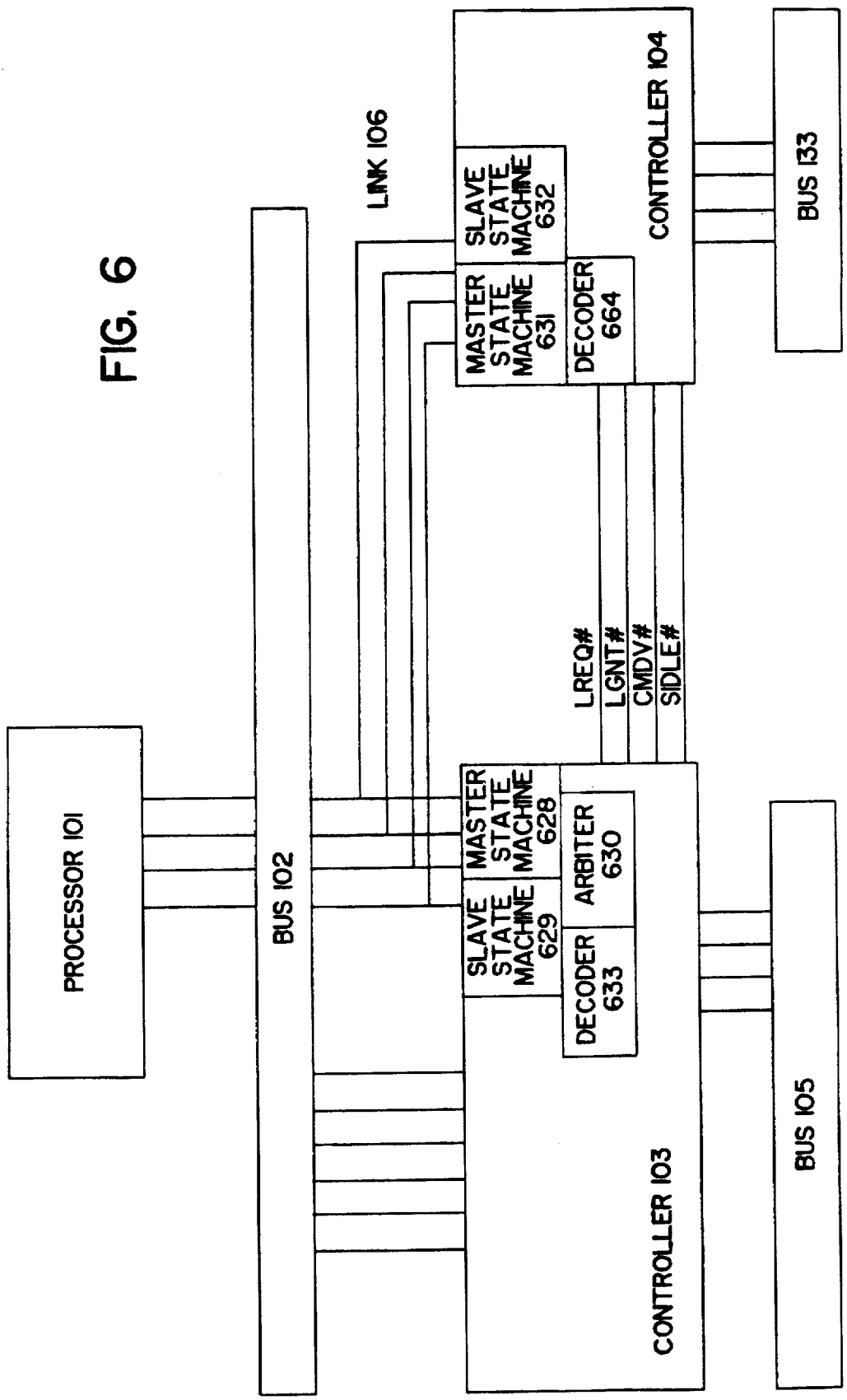
FIG. 6 is a block diagram illustrating controllers of the sixth embodiment of the present invention.

FIG. 6 is a block diagram illustrating controllers of the sixth embodiment of the present invention. Although only four lines are shown in link 106 for ease of illustration, link 106 actually comprises of 16 separate lines. Likewise, controller 103 has sixteen nodes which transmit address signals to processor 101 and receive address signals from processor 101. The sixteen nodes also transmit command, address and data signals over link 106 to controller 104 and receive command, address and data signals over link 106 from controller 104. Controller 103 also comprises of decoder 633, arbiter 630, master state machine 628 and slave state machine 629. Controller 104 comprises of decoder 664, master state machine 631 and slave state machine 632. Decoder 633 decodes addresses transmitted by CPU 101, a component on bus 105 or controller 104. Arbiter 630 arbitrates access to link 106 and the address lines to processor 101. Decoder 664 decodes addresses transmitted by a component on bus 133 or controller 103. Master state machine 628 transmits command, address and data signals over link 106 to controller 104. Slave state machine 629 receives command, address and data signals over link 106 from controller 104. Master state machine 631 transmits command, address and data signals over link 106 to controller 103 and slave state machine 632 receives command, address and data signals over link 106 from controller 103.

Figure 7:
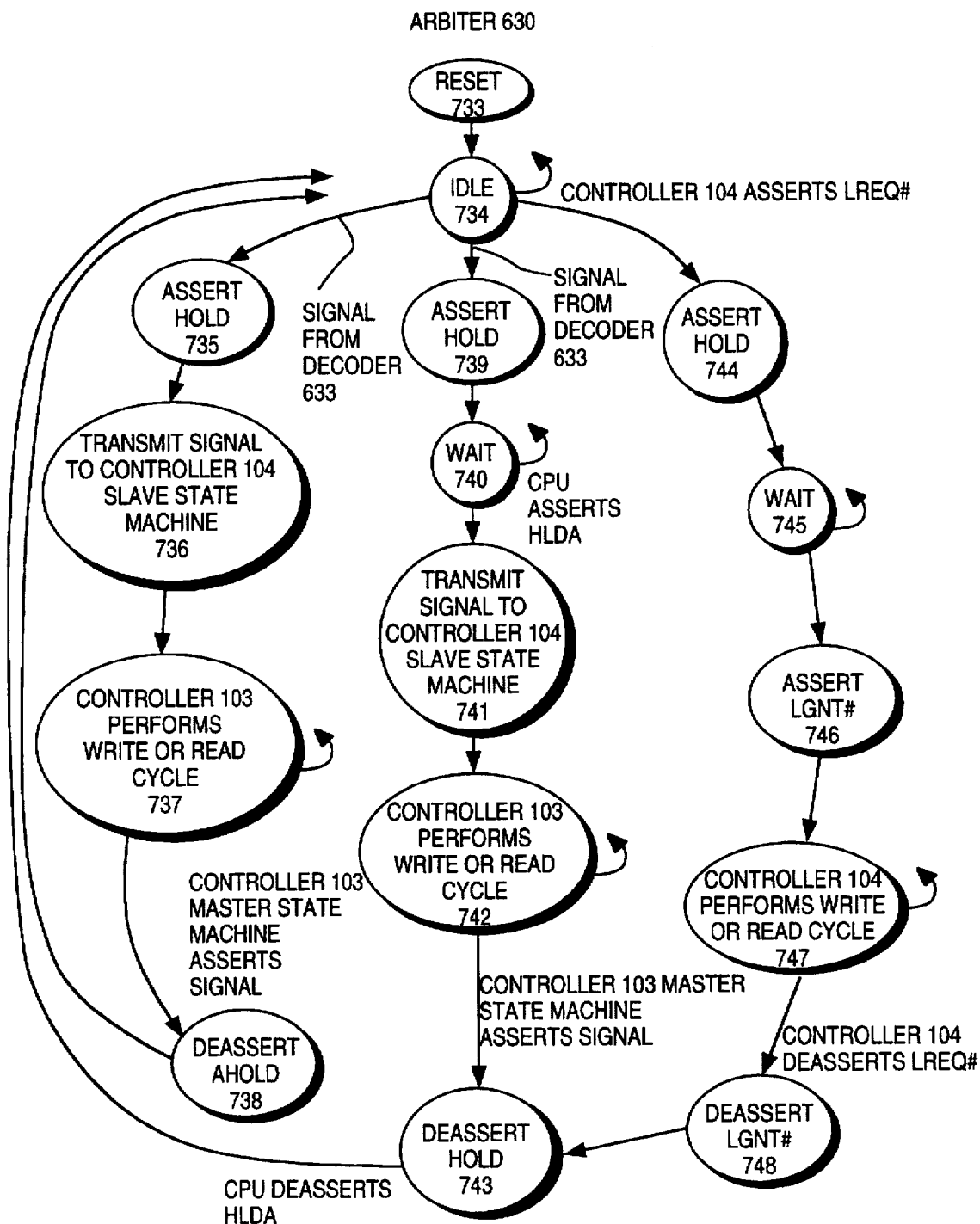
FIG. 7 is a state diagram illustrating the operation of the arbiter of FIG. 6.

FIG. 7 is a state diagram illustrating the operation of the arbiter of FIG. 6. When the computer system is turned on, arbiter 630 powers up in the RESET mode as shown in state 733. Arbiter 630 transitions to the IDLE mode shown in state 734 and remains in the IDLE mode until one of three events occurs. The first event is a signal (HATCOMIO) from decoder 633 indicating a write or read cycle from CPU 101 to controller 104 over link 106. Upon receipt of the signal, arbiter 630 transitions to state 735 where it asserts an AHOLD signal to CPU 101. When CPU 101 floats the address lines in response to the AHOLD signal, arbiter 630 transitions to state 736 where it transmits a signal (HDONE) to slave state machine 632 in controller 104. The signal instructs slave state machine 632 to assert a SIDLE# signal. Arbiter 630 then transitions to a wait state while controller 103 performs the read or write cycle as shown in state 737. When master state machine 628 in controller 103 has completed the read or write cycle, it asserts a signal (LDONE) to arbiter 630. Upon receipt of this signal, arbiter 630 transitions to state 738 where it deasserts the AHOLD signal to CPU 101. Arbiter 630 then transitions back to IDLE state 734.

The second event causing arbiter 630 to transition out of idle state 734 is a signal from decoder 633 indicating a read or write cycle from a component on bus 105 or controller 103 over link 106. Upon receipt of this signal (PSUBDEC), arbiter 630 transitions to state 739 where it asserts a HOLD signal to CPU 101. Arbiter 630 then transitions to wait state 740 where it remains until CPU 101 asserts a HLDA signal. Upon receipt of the HLDA signal, arbiter 630 transmits a signal to slave state machine 632 in controller 104 as shown in state 741. The signal instructs slave state machine 632 to assert a SIDLE# signal. Arbiter 630 then transitions to a wait state as shown in state 742 while controller 103 performs the write or read cycle. When controller 103 has completed the write or read cycle, master state machine 628 in controller 103 asserts a signal (LDONE) back to arbiter 630. Upon receipt of this signal, arbiter 630 transitions to state 743 where it deasserts the HOLD signal to CPU 101. CPU 101 in turn deasserts the HLDA signal and arbiter 630 transitions back to IDLE state 734.

The third event causing arbiter 630 to transition out of idle state 734 is the assertion of a LREQ# by controller 104. Upon receipt of the LREQ# signal, arbiter 630 transitions to state 744 where it asserts a HOLD signal to CPU 101. Arbiter 630 then transitions to wait state 745 where it remains until CPU 101 asserts a HLDA signal. Upon receipt of the HLDA signal from CPU 101, arbiter 630 asserts a LGNT# signal to controller 104 as shown in state 746. Arbiter 630 then transitions to wait state 747 where it remains until controller 104 has completed the read or write cycle. When controller 104 has completed the read or write cycle, it deasserts the LREQ# signal. At that point, arbiter 630 transitions to state 748 where it deasserts the LGNT# signal. Arbiter 630 also deasserts the HOLD signal as shown in state 743. CPU 101 responds by deasserting the HLDA signal and arbiter 630 transitions back to idle state 734. It will be appreciated that the third event is a read or write cycle from a component on bus 133 or controller 104 over link 106.

Figure 8:
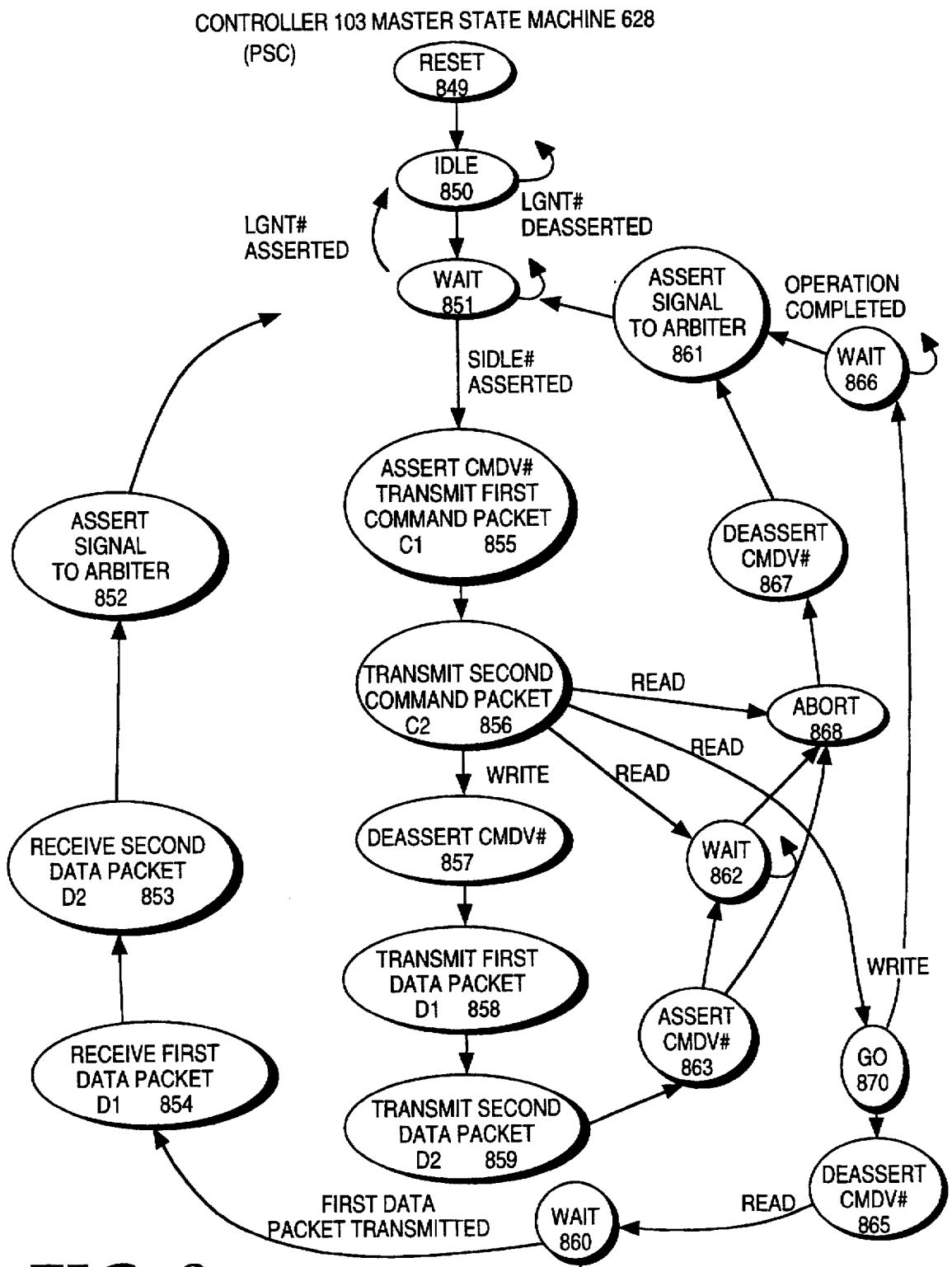
FIG. 8 is a state diagram illustrating the operation of a master state machine of FIG. 6.

FIG. 8 is a state diagram illustrating the operation of a master state machine of FIG. 6. When the computer system is turned on, master state machine 628 and controller 103 powers up in reset state 849. Master state machine 628 then transitions to idle state 850. When the LGNT# signal is deasserted, master state machine 628 transitions to wait state 851. It remains in wait state 851 until controller 104 asserts the LGNT# or until slave state machine 632 in controller 104 asserts the SIDLE# signal. If master state machine 628 senses the assertion of the LGNT# signal it transitions back to idle state 850. On the other hand, if slave state machine 632 asserts the SIDLE# signal, master state machine 628 transitions to state 855 where it asserts a CMDV# signal and transmits the first command packet (C1). Master state machine 628 then transmits the second command packet (C2) as shown in state 856. The next state performed by master state machine 628 depends on whether the cycle performed over link 106 is a write cycle or a read cycle. During a write cycle, master state machine 628 then transitions to state 857 where it deasserts the CMDV# signal. It then transmits the first data packet (D1) as shown in state 858. After the D1 packet, master state machine 628 transmits the second data packet (D2) as shown in state 859. Master state machine 628 then transitions to state 863 where it asserts the CMDV# signal. If controller 103 has completed the subtractive decode of the address, master state machine 628 transitions to GO state 870 when the address indicates a component off of bus 133 including controller 104. Master state machine 628 transitions to ABORT state 868 when the address indicates a destination other than a component on bus 133. If controller 103 has not completed the subtractive decode of the address, master state machine 628 transitions to wait state 862 and remains in the wait state until controller 103 has completed the subtractive decode. Master state machine 628 then transitions to ABORT state 868 or GO state 870 as described above.

When CPU 101 or controller 103 transmits a read cycle over link 106, master state machine 628 does not transmit the first and second data packets after the first and second command packets. Instead, master state machine 628 transitions to abort state 868 when controller 103 has completed the subtractive decode and when the address indicates a destination other than a component on bus 133. It transitions to GO state 870 when controller 103 has completed the subtractive decode and the address indicates a destination of a component on bus 133 including controller 104. It transitions to wait state 862 when controller 103 has not completed the subtractive decode and remains in wait state 862 until controller 103 has completed the subtractive decode. After wait state 862, master state machine 628 transitions to ABORT state 868 or GO state 870 as described above.

In ABORT state 868, master state machine 628 asserts an ABORT command to controller 104 and slave state machine 632. The ABORT command causes controller 104 to cease processing of previous commands and data transmitted to it by master state machine 628. Master state machine 628 then transitions to state 867 where it deasserts the CMDV# signal. It then transitions to state 861 where it asserts a signal to arbiter 630 indicating that it has completed the cycle. Master state machine 628 then transitions to wait state 851.

In GO state 870, master state machine 628 transmits a GO command to controller 104 and slave state machine 632. The GO command causes controller 104 to complete processing of the commands and data previously transmitted by master state machine 628. Master state machine 628 then transitions to state 865 where it deasserts the CMDV# signal. In a write cycle, master state machine 628 then transitions to wait state 866 where it remains until the write operation is completed. Master state machine 628 then asserts a signal to arbiter 630 as shown in state 861. It then transitions to wait state 851. On the other hand, in a read cycle, master state machine 628 transitions to wait state 860 where it remains until controller 104 transmits the first data packet (D1). Master state machine 628 then transitions to state 854 where it receives the first data packet. It then transitions to state 853 where it receives the second data packet (D2). After the D2 packet, master state machine 628 asserts a signal to arbiter 630 as shown in state 852 and transitions to wait state 851.

Figure 9:
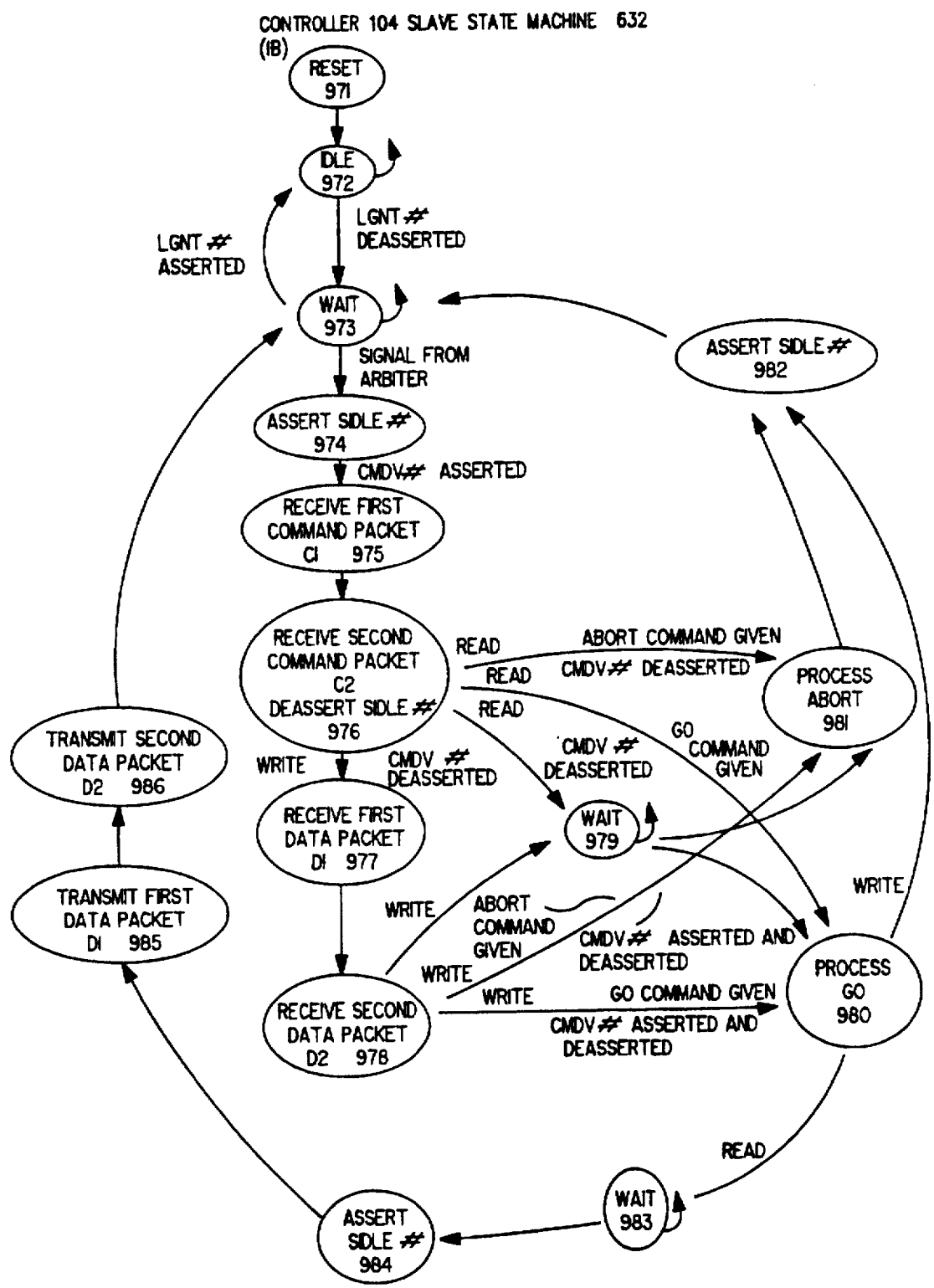
FIG. 9 is a state diagram illustrating the operation of a slave state machine in FIG. 6.

FIG. 9 is a state diagram illustrating the operation of a slave state machine in FIG. 6. When the computer system is turned on, slave state machine 632 powers up in RESET state 971. It then transitions to IDLE state 972 where it remains if the LGNT# signal is asserted. If the LGNT# signal is deasserted, slave state machine 632 transitions to WAIT state 973. When slave state machine 632 receives a signal from arbiter 630, it asserts a SIDLE# signal as shown in state 974. When master state machine 628 asserts the CMDV# signal, slave state machine 632 transitions to state 975 where it receives the first command packet (C1). It then transitions to state 976 where it receives the second command packet (C2) and where it deasserts the SIDLE# signal. When the operation is a write cycle, master state machine 628 deasserts the CMDV# signal. Slave state machine 632 then receives the first data packet (D1) as shown in state 977. Afterwards it receives the second data packet (D2) as shown in state 978. If master state machine 629 transmits a ABORT command, slave state machine 632 transitions to state 981. If master state machine 628 transmits a GO command, slave state machine 632 transitions to state 980. If master state machine 628 transmits neither a ABORT command nor a GO command, slave state machine 632 transitions to WAIT state 979 where it remains until master state machine 628 transmits a ABORT command or a GO command.

On the other hand when the operation is a read cycle, slave state machine 632 does not receive the first data packet and the second data packet after the first and second command packets. Instead, after it receives the second command packet and deasserts the SIDLE# signal in state 976, it transitions to state 981 if master state machine 628 transmits a ABORT command. Alternatively, slave state machine 632 transitions to state 980 if master state machine 628 transmits a GO command. When master state machine 628 transmits neither a ABORT command nor a GO command, slave state machine 632 transitions to WAIT state 979 where it remains until master state machine 628 transmits a ABORT or a GO command. It then transitions to state 981 for a ABORT command or state 980 for a GO command.

In state 981, slave state machine 632 processes the ABORT command transmitted by master state machine 628. It causes controller 104 to cease all processing of prior commands and data transmitted by master state machine 628. Slave state machine 632 then asserts a SIDLE# signal as shown in state 982 and transitions back to WAIT state 973.

In state 980, slave state machine 632 processes the GO command transmitted by master state machine 628. The GO command causes controller 104 to complete processing of commands and data previously transmitted by master state machine 628. In a write cycle, slave state machine 632 then asserts a SIDLE# signal as shown in state 982 and transitions back to WAIT state 973. On the other hand, in a read cycle, slave state machine 632 transitions to WAIT state 983 where it remains until the data requested is ready. At that point, slave state machine 632 asserts the SIDLE# signal as shown in state 984. It then transmits the first data packet (D1) as shown in state 985 and transmits the second data packet (D2) as shown in state 986. Finally, slave state machine 632 transitions back to WAIT state 973.

Figure 10:
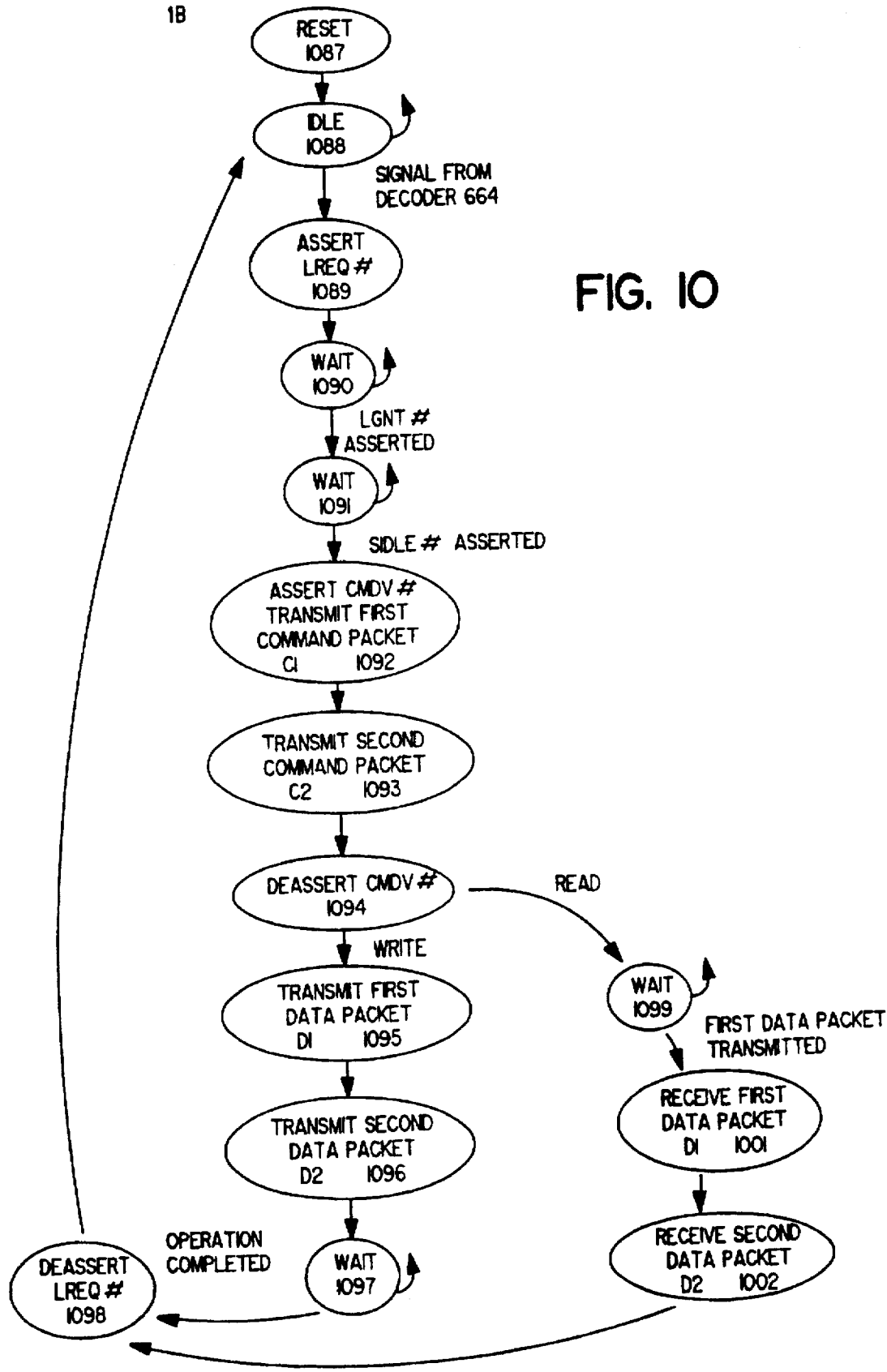
FIG. 10 is a state diagram illustrating the operation of a master state machine of FIG. 6.

FIG. 10 is a state diagram illustrating the operation of a master state machine of FIG. 6. Master state machine 631 is located in controller 104 and controls the transmission of signals over link 106 during a read cycle or a write cycle initiated by controller 104. When the computer system is turned on, master state machine 631 powers up in RESET state 1087. Master state machine 631 then transitions to IDLE state 1088 where it remains until it receives a signal from decoder 664 in controller 104 indicating a read or write cycle initiated by controller 104 or another component on bus 133. Upon receipt of the signal, master state machine 631 asserts the LREQ# signal as shown in state 1089. It then transitions to WAIT state 1090 where it awaits a LGNT# signal from arbiter 630. Upon the receipt of the LGNT# signal, master state machine 631 enters WAIT state 1091 where it remains until slave state machine 629 and controller 103 asserts the SIDLE# signal. After receipt of the SIDLE# signal, master state machine 631 asserts the CMDV# signal and transmits the first command packet (C1) as shown in state 1092. Master state machine 631 then transmits the second command packet (C2) as shown in state 1093. At the end of the second command packet, master state machine 631 deasserts the CMDV# signal as shown in state 1094. In a write cycle operation, master state machine 631 then transmits the first data packet (D1) as shown in state 1095 and transmits the second data packet (D2) as shown in state 1096. It then transitions to WAIT state 1097 where it remains until the operation is completed. At that point it deasserts the LREQ# signal as shown in state 1098 and transitions back to IDLE state 1088.

On the other hand, in a read cycle operation, master state machine 631 transitions from state 1094 to wait state 1099 where it remains until controller 103 transmits the first data packet. At that point master state machine 631 transitions to state 1001 where it receives the first data packet (D1). It then receives the second data packet (D2) as shown in state 1002. Master state machine 631 then deasserts the LREQ# signal as shown in state 1098 and transitions back to IDLE state 1088.

Figure 11:
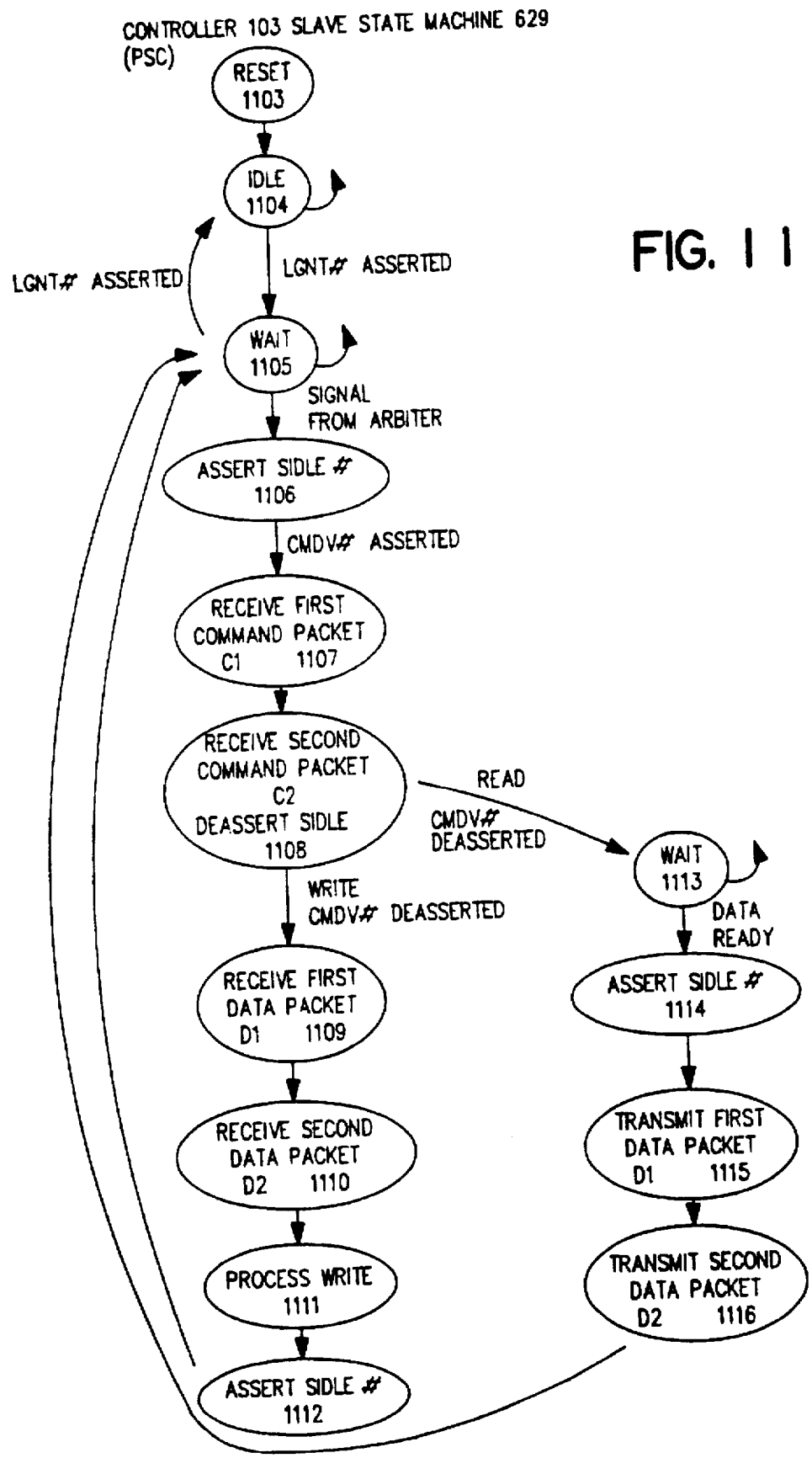
FIG. 11 is a state diagram illustrating the operation of a slave state machine of FIG. 6.

FIG. 11 is a state diagram illustrating the operation of a slave state machine of FIG. 6. Slave state machine 629 is located in controller 103. When the computer system is turned on, slave state machine 629 powers up in RESET state 1103. It then transitions to IDLE state 1104 where it remains while the LGNT# is deasserted. When arbiter 630 asserts the LGNT# signal, slave state machine transitions to WAIT state 1105 where it remains until it receives a signal from arbiter 630 indicating a read or write cycle initiated by controller 104. Slave state machine 629 then asserts a SIDLE# signal as shown in state 1106. Master state machine 631 responds by asserting a CMDV# signal and transmitting the first command packet (C1). Slave state machine 629 receives the first command packet as shown in state 1107. It then receives the second command packet (C2) and deasserts the SIDLE# signal as shown in state 1108. In a write cycle operation, master state machine 631 deasserts the CMDV# signal. Slave state machine 629 receives the first data packet (D1) and receives the second data packet (D2) as shown in states 1109 and 1110. It then processes the write cycle as shown in state 1111. When the write cycle operation is completed, slave state machine 629 asserts the SIDLE# as shown in state 1112 and transitions back to wait state 1105.

On the other hand, in a read cycle operation, master state machine 631 deasserts the CMDV# signal and slave state machine 629 transitions to WAIT state 1113 where it remains until the data requested is ready. When the data is ready to be transmitted back to controller 104, slave state machine 629 asserts the SIDLE# signal as shown in state 1114. It then transmits the first data packet (D1) and the second data packet (D2) as shown in states 1115 and 1116. Slave state machine 629 then transitions back to wait state 1105.

Under a seventh embodiment of the present invention, controller 103 will float CMDV# on the cycle it activates LGNT#. Controller 103 will always initially drive SIDLE# low, so that controller 104 may immediately begin its transaction without waiting to sample a valid SIDLE#. In addition, SIDLE# is always driven low at the end of a requested transaction by controller 103 or controller 104. Thus, there is no need to signal the slave to assert SIDLE# at the beginning of a cycle.

It will be appreciated that the method and apparatus described for asserting and deasserting the various control signals allows a link to be coupled to a line used for a particular purpose. Thus, a line used for one purpose (i.e. transmitting address signals between CPU 101 and controller 103) can also serve a second purpose (i.e. forming a part of link 106 to transmit command, status, address and data between controller 103 and controller 104). Coupling the link to a line already needed for a particular purpose allows the link to utilize the pin connected to the line instead of utilizing a separate pin. Thus, pin savings are achieved. In the example of a link with 16 lines coupled to 16 address lines, the link utilizes the 16 pins used by the address lines instead of additional pins. Consequently, 16 pins are saved in addition to the 21 pins saved as described previously.

What is claimed is:

1. A computer system comprising:

a processor;

a memory coupled to the processor;

a plurality of components coupled to a first bus;

a plurality of components coupled to a second bus;

a first component controlling transmission of signals on the first bus, the first component coupled to the first bus and coupled to the processor by a dual function line, the dual function line carrying a plurality of types of information;

a second component controlling transmission of signals on the second bus, the second component being coupled to the second bus, to the first component by a plurality of signal lines, and to the dual function line by a link which carries signals between the first component, the second component and the processor;

an arbitration circuit coupled to the dual function line for arbitrating access to the link such that the second component accesses the link only after sending a link request signal to the first component over one of the plurality of signal lines.

2. The computer system of claim 1, wherein the dual function line comprises address lines and wherein the arbitration circuit further arbitrates access to the address lines.

3. The computer system of claim 1, wherein the first component comprises:

a first master state machine coupled to the arbitration circuit for sending signals to and receiving signals from the arbitration circuit, and for transmitting command, address and data signals over the link and over the plurality of signal lines to the second component;

a first slave state machine for receiving command, address and data signals over the link and over the plurality of signal lines from the second component; and a first decoder for decoding addresses transmitted by the processor, the second component, and the plurality of components on the first bus.

4. The computer system of claim 3, wherein the second component comprises:

a second master state machine for transmitting command, address and data signals over the link and over the plurality of signal lines to the first component;

a second slave state machine for receiving command, address and data signals over the link and over the plurality of signal lines from the first component; and a second decoder for decoding addresses transmitted by the first component and the plurality of components on the second bus.

5. The computer system of claim 4, wherein the plurality of signal lines comprise an idle signal line for carrying a signal indicating the completion of a transaction, a command line for carrying a signal indicating a command signal is being sent over the link, a link request line for carrying a link request signal from the second component requesting access to the link, and a link grant line for carrying a link grant signal from the first component indicating the link is free.

6. The computer system of claim 5, wherein the first master state machine transmits command, address and data signals over the link prior to the determination of a destination, and wherein the first master state machine issues a GO command to the second slave state machine when the destination is determined to be a component on the second bus, the GO command directing the second slave machine to continue processing the command, address and data signals.

7. The computer system of claim 6, wherein the first master state machine issues an ABORT command to the second slave machine when it determines that the destination is a component on the first bus, the ABORT command directing the second slave machine to stop processing the command, address and data signals.

8. The computer system of claim 1, wherein the first component and the second component comprise bus controllers.

* * * * *

UNITED STATES PATENT AND TRADEMARK OFFICE
CERTIFICATE OF CORRECTION

PATENT NO. : 5,706,444
DATED : January 6, 1998
INVENTOR(S) : Dobbins et al.

It is certified that error appears in the above-identified patent and that said Letters Patent is hereby corrected as shown below:

In column 9 at line 29 delete "tines" and insert --lines--

Signed and Sealed this

Ninth Day of June, 1998

Attest:

BRUCE LEHMAN

Attesting Officer

Commissioner of Patents and Trademarks